United States Patent
Kim et al.

(10) Patent No.: US 9,465,661 B2
(45) Date of Patent: Oct. 11, 2016

(54) METHOD AND DEVICE FOR MANAGING MEMORY OF USER DEVICE

(71) Applicant: Samsung Electronics Co., Ltd., Gyeonggi-do (KR)

(72) Inventors: Junha Kim, Gyeonggi-do (KR); Jaeho Ju, Gyeonggi-do (KR); Dongho Kim, Gyeonggi-so (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/261,289

(22) Filed: Apr. 24, 2014

(65) Prior Publication Data
US 2014/0325518 A1 Oct. 30, 2014

(30) Foreign Application Priority Data
Apr. 24, 2013 (KR) ........................ 10-2013-0045703

(51) Int. Cl.
| | | |
|---|---|---|
| *G06F 9/455* | (2006.01) | |
| *G06F 9/46* | (2006.01) | |
| *G06F 9/50* | (2006.01) | |
| *G06F 9/48* | (2006.01) | |

(52) U.S. Cl.
CPC ............. *G06F 9/5022* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 6,408,313 B1 * | 6/2002 | Campbell et al. ............ 711/170 |
| 7,028,225 B2 * | 4/2006 | Maso et al. .................. 714/47.2 |
| 7,421,592 B1 * | 9/2008 | Kadatch et al. ............. 713/300 |
| 8,214,619 B1 * | 7/2012 | Connolly et al. ............ 711/171 |
| 8,510,596 B1 * | 8/2013 | Gupta et al. ..................... 714/15 |
| 2006/0275934 A1 * | 12/2006 | Pohl ........................ G06F 9/485 438/14 |
| 2008/0022279 A1 | 1/2008 | Jung |
| 2008/0177994 A1 * | 7/2008 | Mayer ............................. 713/2 |
| 2009/0113444 A1 * | 4/2009 | Hackborn et al. ............ 719/312 |
| 2010/0251263 A1 * | 9/2010 | Coelho ............... G06F 11/3433 719/314 |
| 2011/0252430 A1 * | 10/2011 | Chapman et al. ............ 718/107 |
| 2012/0174106 A1 | 7/2012 | Seo et al. |
| 2012/0209946 A1 * | 8/2012 | McClure ............. H04N 21/233 709/217 |
| 2012/0210321 A1 * | 8/2012 | Silva et al. .................... 718/100 |
| 2012/0260118 A1 | 10/2012 | Jiang et al. |
| 2013/0061249 A1 * | 3/2013 | Schwartz, Jr. ...... G06F 9/44521 719/318 |
| 2013/0067186 A1 * | 3/2013 | Pronovost et al. ........... 711/170 |
| 2013/0082916 A1 * | 4/2013 | Dixit ...................... G06F 3/011 345/156 |
| 2013/0332942 A1 * | 12/2013 | Ramesh et al. ............... 719/318 |
| 2014/0179272 A1 * | 6/2014 | Zhang et al. .................. 455/411 |

FOREIGN PATENT DOCUMENTS

| | | |
|---|---|---|
| KR | 10-2008-0052339 A | 6/2008 |
| KR | 10-2012-0077265 A | 7/2012 |

OTHER PUBLICATIONS

International Search Report dated Aug. 30, 2014 in connection with International Application No. PCT/KR2014/003535; 3 pages.

* cited by examiner

*Primary Examiner* — Adam Lee

(57) ABSTRACT

A method and a device dynamically managing background processes according to a memory status so as to efficiently use the memory in a user device supporting a multitasking operating system.
The method includes determining reference information for adjustment of the number of background processes; identifying a memory status based on the reference information; and adjusting the number of the background processes in correspondence to the memory status.

20 Claims, 6 Drawing Sheets

METHOD AND DEVICE FOR MANAGING MEMORY OF USER DEVICE

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0045703, filed on Apr. 24, 2013, which is hereby incorporated by reference for all purposes as if fully set forth herein.

TECHNICAL FIELD

The present disclosure relates to a method and a device for managing a memory of a user device which can support efficient use of the memory by dynamically managing background processes operated in a background in the user device.

BACKGROUND

Recently, with development of digital technologies, various user devices which can perform communication and personal information processing (e.g., a mobile communication terminal, a Personal Digital Assistant (PDA), an electronic organizer, a smart phone, a tablet Personal Computer (PC), and the like) have come to market. Such user devices have reached a mobile convergence stage of encompassing an area of other terminals without being confined to their own traditional unique areas. For example, user devices may be provided with various functions including a call function such as a voice call and a video call, a message transmission/reception function such as a Short Message Service (SMS), a Multimedia Message Service (MMS), and an e-mail, a navigation function, a photography function, a broadcast reproduction function, a media (a video and music) reproduction function, an internet function, a messenger function, a Social Networking Service (SNS) function, and the like.

Under the concept of multitasking, the aforementioned functions simultaneously reside in a memory (e.g., a Random Access Memory (RAM)) in an independent process form, and may perform required operations, alternately occupying the Central Processing Unit (CPU). At this time, users may have an effect of simultaneously performing several functions on a front or rear surface of a user device screen. For example, it is possible for a user to enjoy music while downloading a high-capacity game software from a market software and in addition to reading e-mail. A high capacity of available memory may be required for maintaining the user an agreeable multitasking experience and preventing functions from being suspended due to a deficiency in memory.

Meanwhile, the user devices can manage memory at an Operating System (OS) level. For example, the user devices can manage a predetermined number of background processes at the operating system level. According to an embodiment, a specific number of background processes (e.g., fifteen or twenty four background processes) are determined for various tasks operating in the user devices, and the user devices can manage the determined number of background processes at the operating system level.

In the existing user devices, the determined number of background processes should always be used. Accordingly, when a large-sized (high-capacity) memory is loaded in the user devices, a number of areas in the memory are not used and thus, the memory may be inefficiently operated. Furthermore, when a small-sized (low-capacity) memory is loaded in the user devices, a deficiency in memory is caused by a large number of background processes and thus, the reaction of the user devices is not agreeable and the user devices may be slow or malfunction. Through the memory management techniques in the existing user devices, anticipated multitasking functions and performances can be obtained by allowing the determined number of background processes to reside in the memory. However, due to the fixed number of background processes, the memory (e.g., RAM) cannot be more efficiently used and the capacity of a hardware memory device should be raised in some cases.

SUMMARY

To address the above-discussed deficiencies, it is a primary object of the present disclosure to provide a method and a device for managing a memory of a user device, which can minimize inefficient use of the memory by dynamically managing the number of background processes in the user device and can improve a performance of the user device and use efficiency of the memory.

In various embodiments of the present disclosure, the user device may include all user devices using an Application Processor (AP), a Graphic Processing unit (GPU), and a Central Processing Unit (CPU), such as all information communication devices, all multimedia devices, and all application devices thereof, which support functions according to the various embodiments of the present disclosure.

Another aspect of the present disclosure is to provide a method and a device for managing a memory of a user device, which can secure a memory by decreasing the number of background processes when there is insufficient memory and can secure an advantage in performance by increasing the number of background processes when there is sufficient memory, thereby enabling the memory to be efficiently used.

Another aspect of the present disclosure is to provide a method and a device for managing a memory of a user device, which can improve user convenience and usability of the user device by implementing an optimal environment for managing background processes to efficiently use the memory in the user device.

In accordance with one aspect of the present disclosure, a method of managing background processes of a user device is provided. The method includes: determining reference information for adjustment of the number of background processes; identifying a memory status based on the reference information; and adjusting the number of the background processes in correspondence to the memory status.

In accordance with another aspect of the present disclosure, a computer readable recording medium in which programs for executing the method in a processor are recorded is provided.

In accordance with another aspect of the present disclosure, a user device includes: a memory managed at an operating system level; and a controller that manages background processes according to task management of the user device, a dynamic change in the number of the background processes according to a memory status, and the changed number of the background processes.

In accordance with another aspect of the present disclosure, a computer readable recording medium is provided. The computer readable recording medium stores programs for performing an operation of determining reference information for adjustment of the number of background processes, an operation of identifying a memory status based on the reference information, an operation of adjusting the number of the background processes in correspondence to the memory status, and an operation of managing the background processes according to the adjusted number of the background processes.

In the above mentioned aspects, the features and technical merits of the present disclosure are slightly widely summarized in order that those skilled in the art may understand the present disclosure through the detailed description of the present disclosure later. In addition to the features and the technical merits, additional features and technical merits forming the subject of claims of the present disclosure will be better understood from the detailed descriptions of the present disclosure which will be described below.

As described above, the present disclosure provides a method and a device for managing a memory of a user device which can minimize inefficient use of the memory by dynamically managing the number of background processes in the user device and can improve a performance of the user device and use efficiency of the memory. According to the present disclosure, dynamic background process management can be supported for the efficient use of the memory. Namely, an available memory can be secured by dynamically decreasing the number of background processes when there is insufficient available memory in the user device being used, and an advantage in multitasking performance can be certainly secured by increasing the number of background processes when there is sufficient available memory.

According to the present disclosure, the number of available background processes can be dynamically managed according to a memory status in the user device having a multitasking based operating system (e.g., the Android OS or a similar OS having a multitasking technique). According to the present disclosure, an operation and an entrance speed of a task (e.g., an application) can be secured by increasing the number of background processes when there is sufficient available memory. Furthermore, according to the present disclosure, the available memory can be sufficiently secured by decreasing the number of background processes when there is insufficient available memory, thereby improving stability. As described above, according to the present disclosure, the memory can be more efficiently utilized in the multitasking based operating system capable of achieving an advantage in performance when a process is executed, by allowing the background processes to reside in advance in the memory.

According to the present disclosure, user convenience along with usability, convenience, and competitiveness of the user device can be improved by implementing an optimal environment for managing the background processes to efficiently use the memory in the user device. The present disclosure may be implemented by all types of user devices such as a mobile communication terminal, a smart phone, a tablet PC, a PDA, and the like, and various devices capable of supporting the dynamic background process management according to the embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
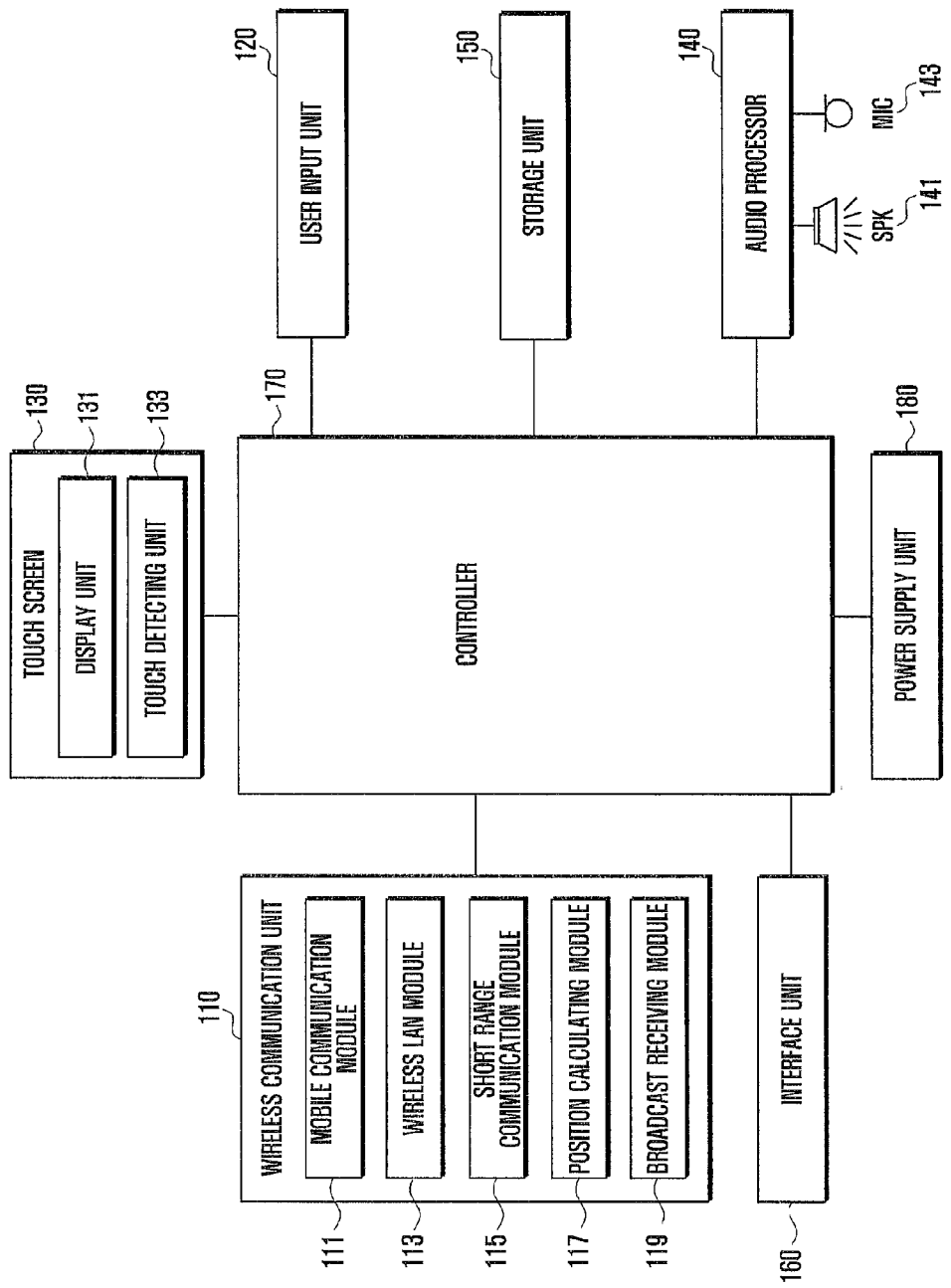
FIG. 1 illustrates a block diagram of a user device according to an embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described in detail with reference to the accompanying drawings. It should be noted that the same elements will be designated by the same reference numerals although they are shown in different drawings. Further, detailed descriptions related to well-known functions or configurations capable of making subject matters of the present disclosure unnecessarily obscure will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

The proposed present disclosure relates to a method and a device for supporting efficient memory management of a user device. According to various embodiments of the present disclosure, background processes operated in a background in a user device supporting a multitasking based Operating System (OS) (e.g., Android OS or a similar OS having a multitasking technique) may be dynamically managed, thereby supporting efficient memory use.

In the operating system having the multitasking technique, background processes corresponding to an operation of various tasks (e.g., a task for an operation of a user device, execution of an application, and the like) may reside in the memory beforehand, thereby achieving an advantage in performance when the corresponding task is executed. In an embodiment of the present disclosure, the number of available background processes may be dynamically managed depending on the status of the memory in the user device. For example, according to an embodiment of the present disclosure, reference information for management of the background processes may be determined with reference to a maximum memory size which can be used by an operation system employed for the user device, used resources, and a screen resolution supported by the user device. The user device may dynamically adjust the number of available background processes depending on the memory status based on the reference information. According to an embodiment, the user device may ensure an operation and an entrance speed of a task (e.g., an application) by increasing the number of background processes when there is sufficient available memory, and may ensure the available memory by decreasing the number of background processes when there is insufficient available memory.

Hereinafter, a configuration of a user device and a method of controlling an operation thereof according to an embodiment of the present disclosure will be described with reference to the accompanying drawings. The configuration of the user device and the method of controlling the operation thereof according to the embodiment of the present disclosure are not restricted by or limited to contents which will be described below and, therefore, it should be noted that they may be applied to various embodiments based on embodiments which will be described below.

FIG. 1 illustrates a block diagram of a user device according to an embodiment of the present disclosure.

Referring to FIG. 1, the user device of the present disclosure may include a wireless communication unit 110, a user input unit 120, a touch screen 130, an audio processor 140, an interface unit 160, a storage unit 150, a controller 170, and a power supply unit 180. In the embodiment of the present disclosure, not all elements illustrated in FIG. 1 are indispensable and thus, the user device may be implemented with more or less elements than illustrated in FIG. 1. For example, when the user device according to the embodiment of the present disclosure supports a photography function, a camera module may be further included in the user device. Furthermore, when the user device according to the embodiment of the present disclosure does not support broadcast receiving and reproducing functions, some modules (e.g., a broadcast receiving module 119 of the wireless communication unit 110) may be omitted.

The wireless communication unit 110 may include one or more modules enabling wireless communication between the user device and a wireless communication system or between the user device and another user device. For example, the wireless communication unit 110 may include a mobile communication module 111, a wireless Local Area Network (LAN) module 113, a short range communication module 115, a position calculating module 117, and a broadcast receiving module 119.

The mobile communication module 111 may transmit/receive a wireless signal to/from at least one of a base station, an external mobile station, and various servers (e.g., an integration server, a provider server, a content server, an internet server, a cloud server, and the like) on a mobile communication network. The wireless signal may include a voice call signal, a video call signal, or various types of data according to text/multimedia message transmission/reception.

The wireless LAN module 113 represents a module for establishing wireless internet access and a wireless LAN link with another user device, and may be embedded in or may be external to the user device. Wireless LAN (Wi-Fi), Wireless broadband (Wibro), World Interoperability for Microwave Access (Wimax), High Speed Downlink Packet Access (HSDPA), or the like may be used as a wireless internet technology. The wireless LAN module 113 may be maintained in a turned-on status or may be turned on according to a user's setting or input.

The short range communication module 115 represents a module for short range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short range communication technology. The short range communication module 115 may be maintained in a turned-on status or may be turned on according to a user's setting or input.

The position calculating module 117 is a module for obtaining a position of the user device, and may include a Global Position System (GPS) module as a representative example. The position calculating module 117 may calculate three dimensional information on a current position according to a latitude, a longitude, and an altitude, by calculating information on a distance away from three or more base stations and accurate time information, and then applying trigonometry to the calculated information. Alternatively, the position calculating module 117 may calculate position information by continuously receiving position information of the user device from three or more satellites in real time. The position information of the user device may be obtained by various methods.

The broadcast receiving module 119 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, or the like).

The user input unit 120 may generate input data for control of an operation of the user device in correspondence to a user's input. The user input unit 120 may include a keypad, a dome switch, a touch pad (resistive type/capacitive type), a jog wheel, a jog switch, a sensor (e.g., a voice recognition sensor, a proximity sensor, an illumination sensor, an acceleration sensor, a gyro sensor, and the like), and the like. Furthermore, the user input unit 120 may be implemented in a button form on the outside of the user device, and some buttons may also be implemented on a touch panel.

The touch screen 130 is an input/output for simultaneously performing an input function and a display function, and may include a display unit 131 and a touch detecting unit 133. The touch screen 130 may display various screens (e.g., a media content reproduction screen, a screen for an outgoing call, a messenger screen, a game screen, a gallery screen, and the like) according to operations of the user device through the display unit 131. When a user's touch event is input through the touch detecting unit 133 while a screen is being displayed through the display unit 131, the touch screen 130 may transfer an input signal according to the touch event to the controller 170. Then, the controller 170 may distinguish the touch event and control an operation according to the touch event.

The display unit 131 may display (output) information processed by the user device. For example, when the user device is in a call mode, the display unit 131 may display a call related User Interface (UI) or Graphical User Interface (GUI). Furthermore, when the user device is in a video call mode or photography mode, the display unit 131 may display a photographed and/or received image, a UI, or a GUI. In addition, the display unit 131 may support a display in a landscape or portrait mode depending on an orientation of the user device (or a direction in which the user device is placed) and a display conversion depending on an orientation change between the landscape and portrait modes.

The display unit 131 may include at least one of a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, and a 3D display. Some of the displays may be implemented as a transparent display configured with a transparent or photo-transparent type such that the outside can be viewed there through.

The touch detecting unit 133 may be positioned on the display unit 131, and may detect a user's touch event input (e.g., a touch based long press input, a touch based short press input, a single-touch based input, a multi-touch based input, a touch based gesture (e.g., a drag) input, or the like) contacting a surface of the touch screen 130. When detecting the user's touch event on the surface of the touch screen 130, the touch detecting unit 133 may detect a coordinate where the touch event is generated, and may transmit the detected coordinate to the controller 170. The controller 170 may perform a function corresponding to an area where the touch event is generated, by the signal transmitted from the touch detecting unit 133.

The touch detecting unit 133 may be configured to convert a change in a pressure applied to a specific portion of the display unit 131 or a change in an electrostatic capacity generated at a specific portion of the display unit 131 into an electric input signal. The touch detecting unit 133 may be configured to detect a touch pressure according to an applied touch method as well as a touched position and a touched area. When there is a touch input for the touch detecting unit 133, a signal (signals) corresponding to the touch input may be transferred to a touch controller (not illustrated). The touch controller (not illustrated) may process the signal (signals), and then may transmit corresponding data to the controller 170. Hereby, the controller 170 may identify which area of the touch screen 130 is touched.

The audio processor 140 may transmit an audio signal input from the controller 170 to a speaker (SPK) 141, and may perform a function of transferring an audio signal such as a voice input from a microphone (MIC) 143 to the controller 170. The audio processor 140 may convert voice/sound data into an audible sound to output the audible sound through the speaker 141 under control of the controller 170, and may convert an audio signal such as a voice received from the microphone 143 into a digital signal to transfer the digital signal to the controller 170.

The speaker 141 may output audio data received from the wireless communication unit 110 or stored in the storage unit 150, in various modes supported by the user device (e.g., a call mode, a message mode, a messenger mode, a voice (video) recording mode, a voice recognition mode, a broadcast reception mode, a media content (e.g., a video and music) reproduction mode, and the like). The speaker 141 may also output a sound signal related to functions (e.g., volume control, reception of a call connection, sending of a call connection, photography, reproduction of a media content file, and the like) performed by the user device.

The microphone 143 may receive an external sound signal, and may process the external sound signal into an electric voice data in a call mode, a message mode, a messenger mode, a voice (video) recording mode, a voice recognition mode, and the like. In the case of the call mode, the processed audio data may be converted into a format that can be transmitted to a mobile communication base station and then may be output through the mobile communication module 111. Various noise removal algorithms for removing noise generated in a process of receiving an external sound signal may be implemented for the microphone 143.

The storage unit 150 may store programs for processing and controlling the controller 170, and may perform a function of temporarily storing input/output data (e.g., contact information, messages, chatting data, media content (e.g., music, a video, and an image), a configured volume value, and the like). The storage unit 150 may store a use frequency (e.g., a use frequency of media content, a use frequency of a volume value within a volume adjustment section, and the like), an importance value, and a priority according to operating functions of the user device. The storage unit 150 may also store various patterns of vibration data and sound data output in response to a touch input on the touch screen 130. The storage unit 150 may continuously or temporarily store an Operating System (OS) of the user device, programs related to input and display control operations using the touch screen 130, a program related to an adjustment of the number of available background processes operated in a background, data generated by an operation of the programs, and the like.

The storage unit 150 may include at least one type of storage medium among a flash memory type memory, a hard disk type memory, a micro type memory, a card type memory (e.g., a Secure Digital (SD) card or an eXtream Digital (XD) card), a Dynamic Random Access Memory (DRAM) type memory, a Static RAM (SRAM) type memory, a Read-Only Memory (ROM) type memory, a Programmable ROM (PROM) type memory, an Electrically Erasable PROM (EEPROM) type memory, a Magnetic RAM (MRAM) type memory, a magnetic disk type memory, and an optical disk type memory. The user device may also operate in relation to a web storage performing a storage function of the storage unit 150 on the Internet. In particular, a memory employed for a memory managing method according to an embodiment of the present disclosure may correspond to a memory (e.g., a RAM) that is managed at an operating system level only by allowing access of the system to the storage unit 150.

The interface unit 160 may serve as a passage between the user device and all external devices connected to the user device. The interface unit 160 may transfer data transmitted or power supplied from an external device to respective elements within the user device, or may allow data within the user device to be transmitted to an external device. For example, the interface unit 160 may include a wired/wireless headset port, an external charger port, a wired/wireless data port, a memory card port, a port for a connection of a device provided with an identification module, an audio input/output port, a video input/output port, an earphone port, and the like.

The controller 170 may control an overall operation of the user device. For example, the controller 170 may perform a control related to voice communication, data communication, video communication, and the like. In an embodiment of the present disclosure, the controller 170 may process operations which are related to task management of the user device, a dynamic change in the number of background processes according to a memory status, management of the background processes according to the changed number of background processes, and the like, and may also be provided with a process management module (not illustrated) for processing them. In the embodiment of the present disclosure, the process management module may be implemented within the controller 170 or separately from the controller 170. A detailed control operation of the controller 170 will be described in an example of an operation of the user device and a control method thereof with reference to drawings as will be illustrated below.

The controller 170 according to the embodiment of the present disclosure may control various operations related to a general function of the user device in addition to the aforementioned functions. For example, when a specific application is executed, the controller 170 may control an operation and displaying of a screen for the specific application. Furthermore, the controller 170 may receive input signals corresponding to various touch event inputs supported by a touch-based input interface (e.g., the touch screen 130) and may control an operation of functions according to the received input signals. Moreover, the controller 170 may also control data transmission/reception based on wired communication or wireless communication.

The power supply unit 180 may receive external power and internal power, and may supply power required for an operation of the elements under the control of the controller 170.

The aforementioned user device according to the various embodiments of the present disclosure may include all devices using an Application Processor (AP), a Graphic Processing unit (GPU), and a Central Processing Unit (CPU), such as all information communication devices, all multimedia devices, and all application devices thereof, which support the functions of the present disclosure. In particular, the user device according to the various embodiments of the present disclosure may include all devices supporting an operating system of a multi-tasking technique (e.g., the Android operating system or a similar operating system with a multi-tasking technique). For example, the user device may include devices such as a tablet Personal Computer (PC), a smart phone, a Portable Multimedia Player (PMP), a portable game terminal, and a Personal Digital Assistant (PDA) in addition to mobile communication terminals operating based on respective communication protocols corresponding to various communication systems.

The various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

In some cases, the embodiments described in the present specification may be implemented by the controller 170 itself. According to the software implementation, the embodiments such as procedures and functions described in the present specification may be implemented as separate software modules (e.g., a process module). The software modules may perform one or more functions and operations described in the present specification.

The recording medium may include a computer readable recording medium storing programs for performing an operation of determining reference information for adjusting the number of background processes, an operation of identifying a memory status based on the reference information, an operation of adjusting the number of background processes to correspond the memory status, and an operation of managing the background processes depending on the adjusted number of background processes.

Figure 2:
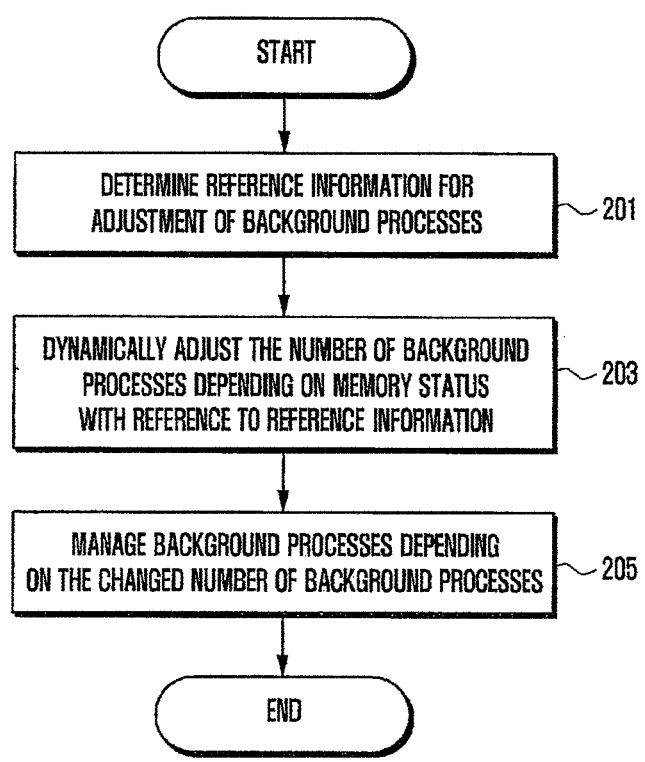
FIG. 2 is a flowchart illustrating a method of managing a memory of a user device according to an embodiment of the present disclosure.

FIG. 2 is a flowchart illustrating a method of managing a memory of a user device according to an embodiment of the present disclosure.

Referring to FIG. 2, a controller 170 may determine reference information for a dynamic adjustment of background processes in step 201. In the embodiment of the present disclosure, the reference information may be determined when a user device is driven (e.g., an operating system is booted up), and may include a threshold value of an available memory for adjusting the number of background processes, and the number of available background processes. For example, the controller 170 may determine the reference information with reference to a resolution of a screen used in the user device, resources (e.g., a GUI, an icon size, and the like), and a total memory size of the user device. Furthermore, the controller 170 may determine the number of available background processes with reference to the reference information. This will be described in an operation example of the user device and a control method thereof with reference to FIG. 3.

The controller 170 may dynamically adjust (change) the number of available background processes depending on a memory status based on the reference information in step 203. For example, the controller 170 may increase the number of background processes when there is sufficient available memory, and may decrease the number of background processes when there is insufficient available memory. This will be described in an operation example of the user device and a control method thereof with reference to FIG. 4.

The controller 170 may manage the background processes depending on the adjusted (changed) number of background processes in step 205. For example, when detecting an event for executing a task, the controller 170 may immediately manage a process of the corresponding task in a background depending on the adjusted number of background processes, or may kill or end at least one of the managed background processes according to priorities thereof and thereafter, manage the process of the corresponding task in the background. This will be described in an operation example of the user device and a control method thereof with reference to FIG. 6.

Figure 3:
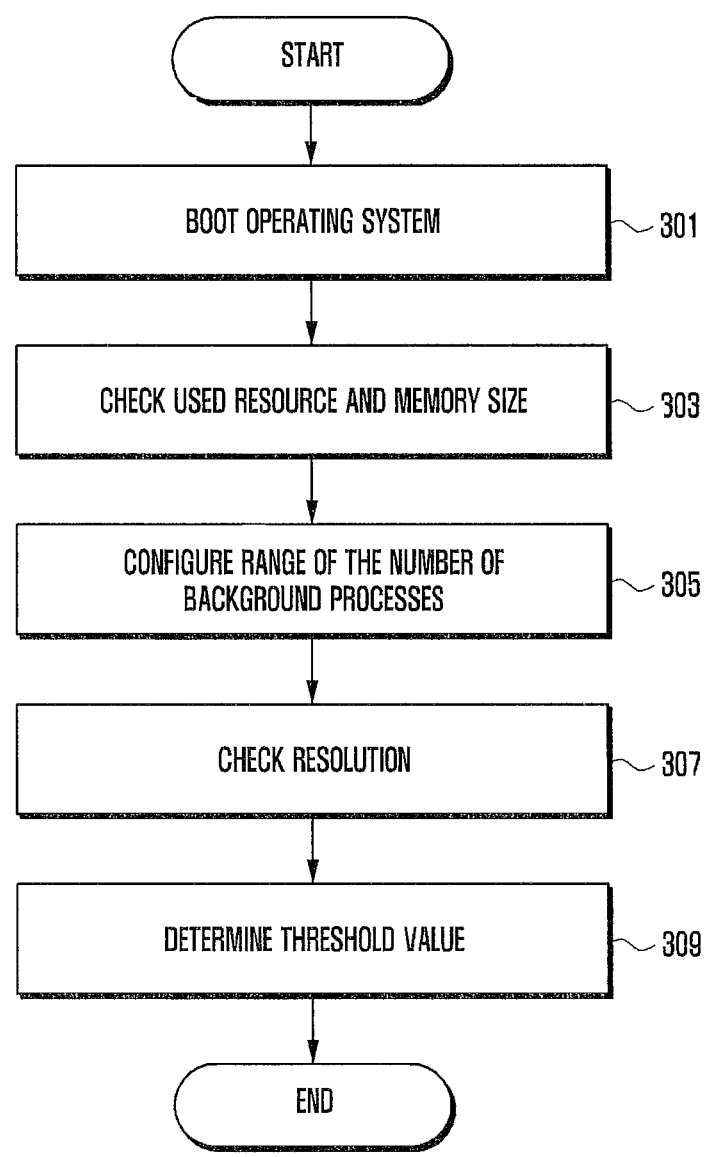
FIG. 3 is a flowchart illustrating an operation of determining reference information for memory management in a user device according to an embodiment of the present disclosure.

FIG. 3 is a flowchart illustrating an operation of determining reference information for memory management in a user device according to an embodiment of the present disclosure.

Referring to FIG. 3, when an operating system is booted up in step 301, a controller 170 may check used resources and a memory size in step 303. For example, the controller 170 may identify resources exerting an influence on the use of a memory, and a total (maximum) memory size which can be used by the operating system.

The controller 170 may configure a range for the number of background processes according to the used resources and the memory size in step 305. For example, the controller 170 may configure the maximum number and the minimum number of available background processes depending on the used resources and the memory size.

The controller 170 may check a screen resolution of the user device in step 307. In addition, the controller 170 may configure a threshold value of an available memory for dynamically adjusting the number of background processes depending on the screen resolution. Examples of the threshold value for the screen resolution are illustrated in Table 1 below.

TABLE 1

| RESOLUTION | THRESHOLD VALUE |
|---|---|
| 1920 × 1080 | 200 MB |
| 1280 × 720 | 150 MB |
| . . . | . . . |
| 480 × 800 | 80 MB |

As illustrated in Table 1, the threshold value may be differently determined depending on the screen resolution of the user device. In the embodiment of the present disclosure, the threshold value may vary in proportion to the size of the screen resolution. For example, in cases of high screen resolution, the threshold value for determining the number of background processes may be configured to have a large value (e.g., 200 MB), and in cases of low screen resolution, the threshold value for determining the number of background processes may be configured to have a small value (e.g., 80 MB). Namely, the threshold value may be configured as a larger value as the screen resolution becomes higher, and as a smaller value as the screen resolution becomes lower. In the present disclosure, the threshold values for the respective screen resolutions are represented as an example for convenience of description, and are not limited to those illustrated in Table 1. The threshold values for the respective screen resolutions may be configured in advance at a time point of developing the user device.

As described above, according to the embodiment of the present disclosure, when the user device is booted up, the basic information such as the threshold value for operating the background processes and the range of the number of background processes may be configured, and after the user device is completely booted up, the number of background processes for background management of various processes may be dynamically changed with reference to the basic information.

Figure 4:
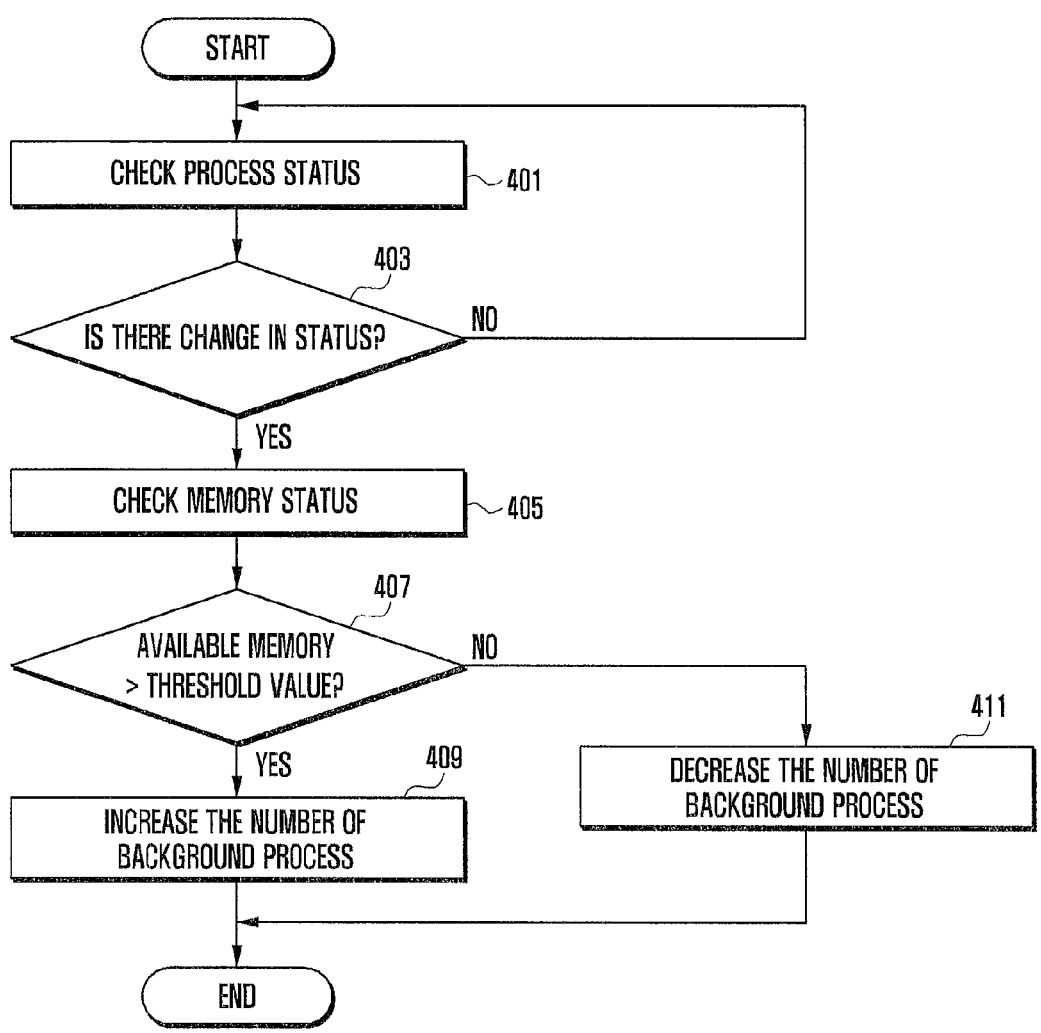
FIG. 4 is a flowchart illustrating an operation of adjusting the number of background processes in a user device according to an embodiment of the present disclosure.
Figure 5:
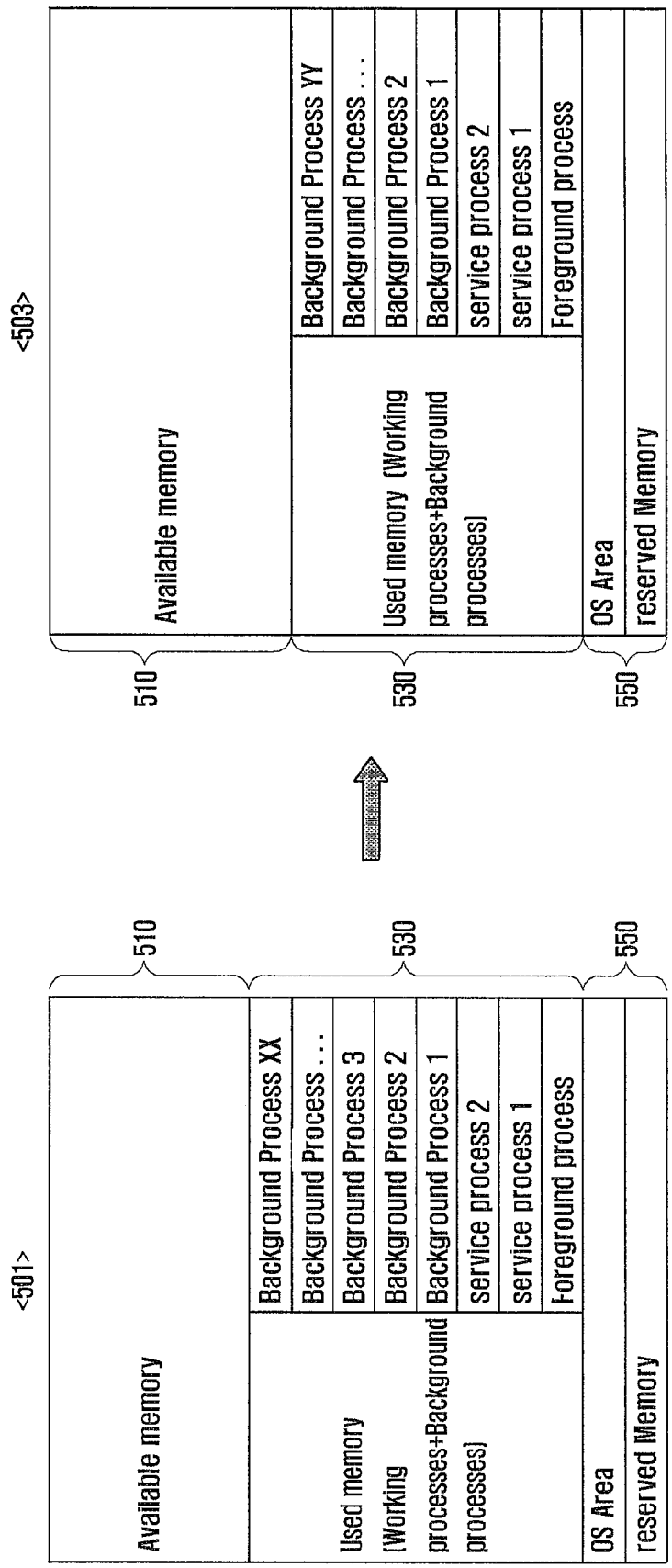
FIG. 5 illustrates an example of an operation of adjusting the number of background processes in a user device according to an embodiment of the present disclosure.

FIG. 4 is a flowchart illustrating an operation of adjusting the number of background processes in a user device according to an embodiment of the present disclosure, and FIG. 5 illustrates an example of an operation of adjusting the number of background processes in a user device according to an embodiment of the present disclosure.

Referring to FIG. 4, a controller 170 may check a process status of the user device in step 401, and may determine whether the process status has been changed in step 403. For example, the controller 170 may detect a change in the process status according to an operation of various tasks in real time, when the user device is operating normally after being completely booted up.

When it is determined that the process status has been changed, the controller 170 may check a memory status in step 405, and may compare a threshold value with a size of an available memory in step 407. For example, when the process status is detected to be changed while the user device is being operated, the controller 170 may identify the size of the available memory, which can be used in the memory, by checking the memory status. The controller 170 may compare the size of the available memory with the threshold value configured when the user device was booted up.

When it is determined in step 407 that the size of the available memory is larger than the threshold value, the controller 170 may increase the number of processes which can be operated in a background, namely, the number of background processes, in step 409. When it is determined in step 407 that the size of the available memory is smaller than or equal to the threshold value, the controller 170 may decrease the number of background processes which can be operated in the background in step 411. In the embodiment of the present disclosure, the number of background processes adjusted depending on the memory status may be defined in advance according to the size of the available memory.

In FIG. 5, an example of the operation is illustrated in which the number of background processes is adjusted depending on the memory status as described above with reference to FIG. 4.

Referring to FIG. 5, for convenience of description, the memory may be divided into an available memory area 510, a used memory area 530, and a system allocation area 550 in the embodiment of the present disclosure.

The available memory area 510 may represent a predetermined size of an area that should be ensured for a stable operation of a process. For example, the available memory area 510 may be managed in consideration of a situation in which a large-sized application is to be suddenly loaded on the memory when the user device is in operation.

The used memory area 530 may represent an area in which working processes, background processes, service processes, and the like reside.

The system allocation area 550 may be divided into an OS area used by the operating system and a reserved memory area to which a capacity above a predetermined level is allocated for a stable operation of the system.

As illustrated in FIG. 5, when adjusting the number of background processes, the controller 170 may dynamically adjust the number of background processes, which are operated in the background in the used memory area 530, with reference to the size of the available memory area 510. For example, the available memory area 510 in <503> of FIG. 5 is secured to be larger than the available memory area 510 in <501> of FIG. 5. Namely, FIG. 5 illustrates a case in which the number of background processes in <503> of FIG. 5 is smaller than the number of background processes in <501> of FIG. 5 (for example, XX>YY).

For example, when the size of the available memory area 510 is smaller than the threshold value configured at the time of booting, the controller 170 may decrease the number of background processes in the used memory area 530 to secure the available memory area 510. When the size of the available memory area 510 is larger than the threshold value, the controller 170 may increase the number of background processes in the used memory area 530 to allow much more background processes to reside in the used memory area 530, thereby ensuring an advantage in performance when the corresponding process is executed.

Figure 6:
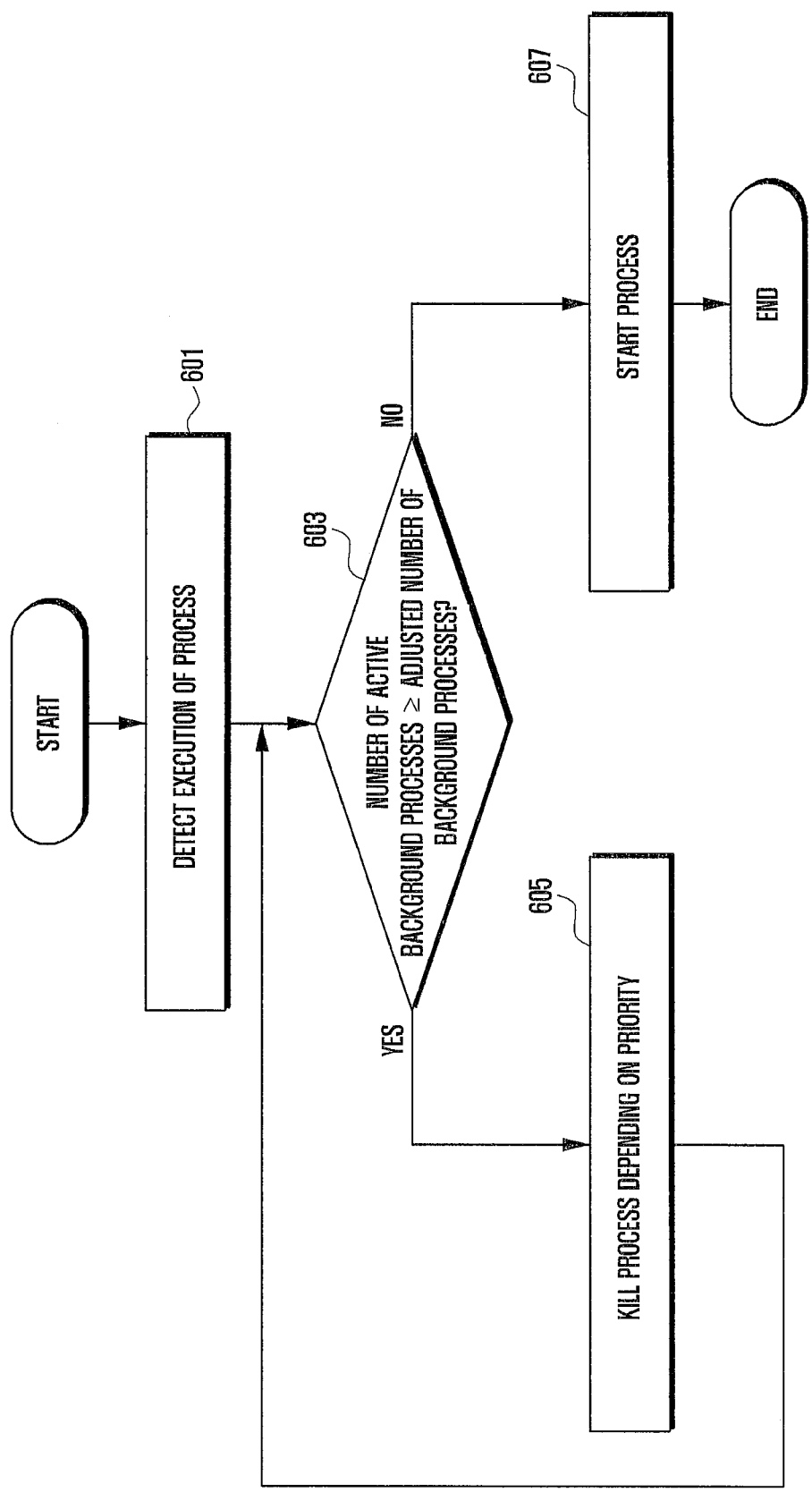
FIG. 6 is a flowchart illustrating an operation of managing background processes in a user device according to an embodiment of the present disclosure.

FIG. 6 is a flowchart illustrating an operation of managing background processes in a user device according to an embodiment of the present disclosure.

Referring to FIG. 6, when detecting execution of a particular process (e.g., an execution of a new task) in step 601, a controller 170 may check whether the number of active background processes is larger than the adjusted number of background processes in step 603.

When it is determined in step 603 that the number of active background processes is smaller than the adjusted number of background processes, the controller 170 may immediately start the particular process of which the execution has been detected in step 607. Namely, the controller 170 may immediately enter the particular process in the background and manage the particular process.

When it is determined in step 603 that the number of active background processes is larger than or equal to the adjusted number of background processes, the controller 170 may kill or end at least one background process according to a priority of the background processes being managed, and then proceed to step 603 to perform the above-described checking operation. When the number of active background processes is smaller than the adjusted number of background processes after the particular process is killed or ended according to the priority, the controller 170 may start the particular process of which the execution has been detected in step 607. For example, when managing the background processes, the controller 170 may kill or end the oldest (or the first executed) background process and may allocate a memory space to a new task.

As described above, according to the embodiment of the present disclosure, the background processes may be managed depending on the changed number of background processes. Accordingly, restrictions on the efficient management of the memory due to the fixed number of background processes in the memory management technique of the conventional multitasking operating system may be solved. Namely, according to the embodiment of the present disclosure, the number of background processes can be dynamically adjusted, thereby minimizing the inefficient use of the memory. According to the embodiment of the present disclosure, when there is insufficient memory, the memory may be secured by decreasing the number of background processes, and when there is sufficient memory, an advantage on performance may be secured by increasing the number of background processes.

According to various embodiments of the present disclosure, the respective modules may be configured with software, firmware, hardware, or combinations thereof. Furthermore, some or all modules may be configured within one entity, in which case the function of the corresponding module may be identically performed. According to various embodiments of the present disclosure, respective operations may be executed sequentially, repeatedly, or in parallel. Moreover, some operations may be omitted, or other operations may be added and executed.

Meanwhile, the various embodiments of the present disclosure as described above may be implemented in the form of a program instruction that can be performed through various computers, and may be recorded in a computer readable recording medium. The computer readable medium may include a program command, a data file, a data structure, and the like independently or in combination. The program instruction recorded in the recording medium is specially designed and constructed for the present disclosure, but may be well known to and may be used by those skilled in the art of computer software.

The computer readable recording medium may include a magnetic medium such as a hard disc, a floppy disc, and a magnetic tape, an optical recording medium such as a Compact Disc Read Only Memory (CD-ROM) and a Digital Versatile Disc (DVD), a magneto-optical medium such as a floptical disk, and a hardware device specifically configured to store and execute program instructions, such as a Read Only Memory (ROM), a Random Access Memory (RAM), and a flash memory. Further, the program command may include a machine language code generated by a compiler and a high-level language code executable by a computer through an interpreter and the like. The hardware device may be configured to operate as one or more software modules in order to perform operations of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing background processes of a user device, the method comprising:
   determining reference information for adjustment of a number of executing background processes on the user device, the reference information including a maximum number of background processes that can be executed concurrently on the user device; and
   adjusting the number of executing background processes according to the determined maximum number of background processes.

2. The method of claim 1, wherein determining the reference information comprises:
   determining a threshold value for managing processes executing in a background according to a screen resolution, resources, and a total memory size of the user device; and
   determining the maximum number of background processes that can be executed concurrently on the user device.

3. The method of claim 2, wherein determining the reference information further comprises:
   checking the resources and the total memory size; and
   configuring a range of the maximum number of the background processes according to the resources and the total memory size.

4. The method of claim 2, wherein determining the reference information further comprises:
   checking the screen resolution; and
   configuring the threshold value according to the screen resolution.

5. The method of claim 1, wherein adjusting the number of the executing background processes comprises:
   checking a memory status of the user device when a change in a process status is detected; and
   adjusting the number of the executing background processes according to the determined maximum number of background processes.

6. The method of claim 5, wherein adjusting the number of executing background processes according to the determined maximum number of background processes further comprises:
   comparing a threshold value of the reference information with a determined size of an available memory of the user device;
   increasing the maximum number of the background processes when the size of the available memory is larger than the threshold value; and decreasing the maximum number of the background processes when the size of the available memory is smaller than or equal to the threshold value.

7. The method of claim 6, wherein the maximum number of the background processes adjusted according to the size of the available memory is predefined.

8. The method of claim 1, further comprising:
detecting an event for executing a task;
identifying the maximum number of the background processes; and
managing the number of executing background processes according to the identified maximum number of the background processes.

9. The method of claim 8, wherein managing the number of active background processes comprises:
managing a process of the task in the background according to the maximum number of the background processes when the task is executed.

10. The method of claim 8, further comprising:
ending at least one executing background process according to a priority of the executing background processes and then, managing the executing background processes according to executing the task in the background.

11. A user device comprising:
a memory configured to be managed at an operating system level; and
one or more processors configured to:
manage background processes according to task management of the user device;
determine reference information for adjustment of a number of executing background processes on the user device, the reference information including a maximum number of background processes that can be executed concurrently on the user device; and
adjust the number of executing background processes according to the determined maximum number of background processes.

12. The user device of claim 11, wherein the memory comprises an available memory area and a used memory area.

13. The user device of claim 12, wherein the one or more processors are further configured to dynamically adjust the maximum number of the background processes that can be executed concurrently in the used memory area with reference to a size of the available memory area.

14. The user device of claim 12, wherein the one or more processors are further configured to configure a threshold value for managing the executing background processes and the maximum number of background processes according to a screen resolution, resources, and a total memory size of the user device.

15. The user device of claim 14, wherein the one or more processors are further configured to compare the threshold value with a size of the available memory area, and increase or decrease the maximum number of background processes according to the size of the available memory area.

16. The user device of claim 14, wherein the one or more processors are further configured to:
secure the available memory area by decreasing the maximum number of the background processes when the size of the available memory area is smaller than the threshold value; and
allow the executing background processes to additionally reside in the used memory area by increasing the maximum number of background processes when the size of the available memory area is larger than the threshold value.

17. The user device of claim 12, wherein the one or more processors are further configured to predefine the maximum number of the background processes adjusted according to the size of the available memory.

18. The user device of claim 13, wherein the one or more processors are further configured to manage a process of a task in the background according to the maximum number of the background processes when the task is executed.

19. The user device of claim 13, wherein the one or more processors are further configured to end at least one of executing background process according to a priority of the executing background processes and, thereafter, manage a process of a task in the background, when the task is executed.

20. A non-transitory computer readable recording medium comprising program code, that when executed by a processor, perform:
determining reference information for adjustment of a number of executing background processes on a user device, the reference information including a maximum number of background processes that can be executed concurrently on the user device;
adjusting the number of executing background processes according to the determined maximum number of background processes.

* * * * *